Figure 1:
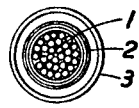

Inventor
Adrian Neville Arman
By Wilfred J. Lawson
Attorney

United States Patent Office 2,697,867
Patented Dec. 28, 1954

2,697,867

ELECTRIC CABLE

Adrian Neville Arman, London, England, assignor to Pirelli-General Cable Works Limited, London, England, a British company Application April 4, 1951, Serial No. 219,158

Claims priority, application Great Britain April 21, 1950

5 Claims. (Cl. 29—155.5)

The present invention relates to oil-filled electric cables of the type which are self-compensating as regards temperature variation by reason of the use of a sheath of non-circular cross section made of a metal, such as stainless steel or certain aluminium alloys, possessing substantial elasticity. It is to be understood that the term "oil-filled cables" as employed in this specification is to be regarded as including cables wherein the filling or impregnating material is sufficiently fluid that when it expands due to rising temperature it can flow out of the dielectric into the spaces between the insulated core or cores and the sheath. On cooling, the oil or the like returns to the dielectric so that complete impregnation is maintained at all times. The object of the invention is to promote the ready and economical manufacture of cables of this type, and to produce a cable which shall be efficient in use and capable of prolonged service under working conditions.

According to the invention, in the manufacture of an electric cable of the type set forth, one or more cable cores is or are drawn into a metal tube of circular cross section, with or without packing material, and the tube is rolled or drawn down to constitute a non-circular sheath which is then evacuated or exhausted of air or gas and filled with oil or insulating compound, such insulation compound being of the type commonly employed in cable construction such as bitumen or other material capable of flowing. The core or cores may or may not be subjected to a preliminary drying process prior to drawing into the tube. The rolling or drawing process to which the tube is subjected may be such that thereby elongation takes place or the original length is maintained. The final cross section of the sheath may be of any appropriate form according to the shape and disposition of the enclosed cores; for instance, it may be of oval or flattened cross section or of triangular cross section with rounded corners, the latter form being particularly appropriate in the case of a three-cored cable. The final form of the sheath and its thickness are chosen to provide any required pressure-volume characteristic, so that expansion of the oil within the sheath may be allowed for by the fact that the sheath, on such expansion, assumes a contour more nearly approximating to that having a circular cross section.

It is to be understood that the invention resides in the mode of manufacture adopted rather than the actual apparatus employed in such manufacture. Machines for rolling or drawing down a tube to a non-circular cross section are well known and are appropriate for the processes according to the present invention. Further reference in the specification to such machines is therefore unnecessary.

In order that the invention may be clearly understood and readily carried into effect, it will now be described more fully with reference to the accompanying drawing, wherein each of the figures represents in cross section, and by way of example only, a sheathed single-core or multicore cable either in one or more stages of its manufacture or in its completed form.

Figure 2:
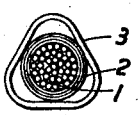

Referring to Figures 1 and 2, a cable is constituted by a single core 1 formed of a series of wires surrounded by insulating material 2. This cable is, according to the present invention, introduced into a tube 3 of circular cross section, made of a metal such as stainless steel or certain aluminum alloys possessing substantial elasticity, the internal diameter of the tube 3 being, as indicated, greater than the external diameter of the insulated cable. If desired, packing material may be introduced into the space between the cable and the tube 3. By means of any appropriate machine the tube is rolled or drawn down to constitute a non-circular sheath of the form depicted in Figure 2, and this non-circular sheath is then evacuated or exhausted of air or gas. Oil or any desired insulating compound is introduced into the sheath 3 and thereby the spaces remaining between the cable and the sheath are filled; at the same time the cable insulation 2, and any packing which has been introduced between the cable and the sheath, in so far as the materials thereof are permeable, are impregnated with the oil or insulating compound.

Figure 3:
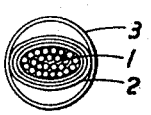
Figure 4:
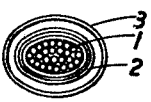

Figures 3 and 4 illustrate the case in which the cable core is of elliptical cross section, the metal tube 3 being, as before, initially of circular cross section, but being rolled or drawn down to an elliptical cross section corresponding to, but of greater area than, that of the insulated cable core, as shown in Figure 4. In this case, seeing that in the finished article the sheath does not bear on the cable core, it is essential that packing shall be introduced into the space between the core and the sheath so that the former may be maintained in proper spaced relationship with the latter.

Figure 5:
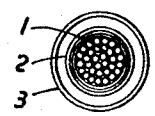
Figure 6:
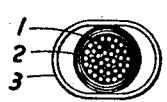

Figures 5 and 6 illustrate the manufacture of a flattened form of single-core sheathed cable, the process followed being evident without further description.

Figure 7:
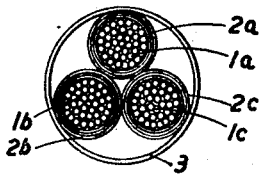
Figure 8:
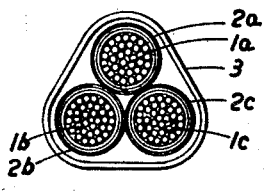
Figure 9:
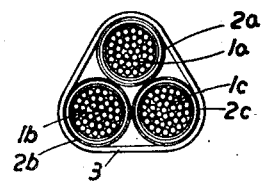

Figures 7, 8 and 9 have reference to a cable comprising three cores 1a, 1b and 1c each surrounded by insulating material 2a, 2b and 2c and disposed in triangular relationship. The three-core cable thus constituted is drawn into a metal tube 3 with or without the introduction of packing material. The tube 3 is then rolled or drawn down to constitute a more-or-less triangular sheath, as shown in Figure 8, which is spaced from the cable cores. If packing has been introduced into the tube 3 with the cable, the product illustrated in Figure 8 might constitute the completed sheathed cable, the cores being spaced from the sheath by such introduced packing. The process of rolling or drawing down the sheath may, however, be continued so as to produce the form shown in Figure 9, this being essential if there be no packing between the cable cores and the sheath so that the latter may bear on the former. The cores 1a, 1b and 1c may lie in parallel relationship, or may be twisted together. In the latter case the rolls or dies performing the shaping operation on the sheath would be geared to rotate in a manner corresponding to the lay of the cores: machines having this action are well known in the art of cable manufacture and require no further description. It is, however, essential that, in starting the rolling or drawing-down operation, the tube 3 must be entered into the rolls or dies in correct orientation relatively to the cable cores, after which such orientation will be automatically maintained.

Figure 10:
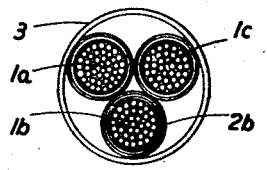
Figure 11:
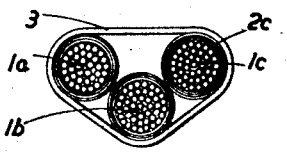
Figure 12:
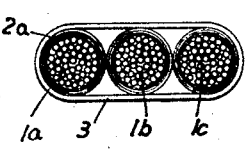

Figures 10, 11 and 12, illustrate the production of a three-core cable of flattened type. Initially the cores 1a, 1b and 1c with their surrounding insulation 2a, 2b and 2c, are parallel and are arranged in triangular relationship and in juxtaposition with each other, as seen in Figure 10, in which position they are introduced into the metal tube 3. As a first stage in the process of forming a non-circular sheath from the tube 3 the rolls or dies are so disposed as to deform the tube to a more-or-less triangular cross section, as illustrated in Figure 11, the cores 1a and 1c being thus separated, while remaining in contact with the core 1b. The sheathed cable of the form depicted in Figure 11 is then passed through further rolls or dies whereby the flattened form of sheath shown in Figure 12 is produced, the cable cores 1a, 1b and 1c remaining in parallel relationship and their axes being in a single plane.

It will be appreciated that, in comparison with the use of tubes initially of non-circular form, a method according to the present invention results in economy by reason of the fact that, starting with a comparatively small number of different sizes of tubes of circular cross section, a large number of sheaths of various shapes and sizes may be produced simply by varying the tools or the like employed in the rolling or drawing operation.

The cable may be completed by any suitable external covering for the sheath, for example, a serving of impregnated hessian.

In the following claims, references to reducing the metal tube are to be read as covering a process either of rolling between rollers or of drawing down through one or more dies; also the term "impregnating material" is to be regarded as including oil or insulating compound.

What I claim and desire to secure by Letters Patent of the United States is:

1. A process for the manufacture of a substantially flat, three-core metal sheath-enclosed electric cable wherein the axes of the cores are substantially in plane with one another, and according to which process three individually insulated cores lying parallel and in mutually contacting triangular relationship are drawn into a metal tube-form sheath of circular cross-section, next reducing said circular sheath to a triangular cross-section by rolling, drawing or like conventional operation and against the resistance of said cores while deforming the triangular arrangement of the latter by forcing one core partially between the other two cores, then compressing said trangular cross-sectioned sheath-form tube into substantially flat form while compressing said intermediate core fully between the other two cores so that the axes of all of the cores will lie in substantially the same plane, all of the cores being maintained in substantially parallel relationship throughout said process steps.

2. The combination set forth in claim 1, but wherein insulating material is introduced into said tube-form sheath with said cores.

3. The process as defined in claim 1, and including the added step of exhausting said flattened sheath-form tube of air or gasses, and then filling empty spaces therein with insulation material.

4. The process of producing a substantially flat, metal sheathed three core cable wherein the axes of the cores lie in substantially the same plane and are so maintained by the sheath, said process comprising firstly the arrangement of individually insulated cores in parallel triangular relationship with each core substantially in contact with the other two, secondly drawing the said triangularly arranged and substantially mutually contacting cores into a metal tube-form sheath of circular cross-section and of an internal diameter to prevent displacement of said cores from triangular and axially parallel arrangement, thirdly reducing said circular sheath to triangular cross-section by rolling, drawing or like conventional operation while deforming the original triangular arrangement of the cores by forcing one of the still parallel cores partially between the other two whereby outward pressure of said cores gives the thus formed cross-sectionally triangular sheath longitudinally coextensive corners conforming to the shape of exterior surface portions of said cores, and finally compressing said sheath into substantially flat form top and bottom while forcing the intermediate one of the still parallel cores fully between the other two cores so that the axes of the still parallel cores will all lie in substantially the same plane whereby a substantially flat-form sheath will be formed having opposite sides conforming to the exterior contour of outer ones of said cores.

5. The process of producing a substantially flat, metal sheathed three core cable wherein the axes of the cores lie in substantially the same plane and are so maintained by the sheath, said process comprising firstly the arrangement of individually insulated cores in parallel triangular relationship with each core substantially in contact with the other two, secondly drawing the said triangularly arranged and substantially mutually contacting cores into a metal tube-form sheath of circular cross-section and of an internal diameter to prevent displacement of said cores from triangular and axially parallel arrangement, thirdly reducing said circular sheath to triangular cross-section by rolling, drawing or like conventional operation while deforming the original triangular arrangement of the cores by forcing one of the still parallel cores partially between the other two whereby outward pressure of said cores gives the thus formed cross-sectionally triangular sheath longitudinally coextensive corners conforming to the shape of exterior surface portions of said cores, then compressing said sheath into substantially flat form top and bottom while forcing the intermediate one of the still parallel cores fully between the other two cores so that the axes of the still parallel cores will all lie in substantially the same plane whereby a substantially flat form sheath will be formed having opposite sides conforming to the exterior contour of outer ones of said cores, and finally exhausting the flattened sheath of gases such as air and filling same with insulating material.

References Cited in the file of this patent

UNITED STATES PATENTS

| Number | Name | Date |
|---|---|---|
| 231,825 | Manly | Aug. 31, 1880 |
| 650,861 | McTighe | June 5, 1900 |
| 1,982,362 | Trembley | Nov. 27, 1934 |
| 2,147,095 | Hochstadter | Feb. 14, 1939 |
| 2,247,041 | Bergan | June 24, 1941 |
| 2,262,716 | Wolfer | Nov. 11, 1941 |
| 2,286,827 | Morrison | June 16, 1942 |
| 2,536,885 | Olson | Jan. 2, 1951 |

FOREIGN PATENTS

| Number | Country | Date |
|---|---|---|
| 954,613 | France | June 13, 1949 |